US012416198B1

(12) United States Patent
Moeller

(10) Patent No.: US 12,416,198 B1
(45) Date of Patent: Sep. 16, 2025

(54) DOOR WEATHERSTRIP PROTECTION DEVICE

(71) Applicant: David W Moeller, Flowery Branch, GA (US)

(72) Inventor: David W Moeller, Flowery Branch, GA (US)

( * ) Notice: Subject to any disclaimer, the term of this patent is extended or adjusted under 35 U.S.C. 154(b) by 0 days.

(21) Appl. No.: 16/873,925

(22) Filed: Aug. 14, 2020

Related U.S. Application Data

(60) Provisional application No. 62/922,313, filed on Aug. 2, 2019.

(51) Int. Cl.
*E06B 7/23* (2006.01)
*E06B 7/26* (2006.01)

(52) U.S. Cl.
CPC ............ *E06B 7/231* (2013.01); *E06B 7/2316* (2013.01); *E06B 7/26* (2013.01); *E05Y 2900/132* (2013.01)

(58) Field of Classification Search
CPC ............................... E06B 7/231; E06B 7/2305
USPC ............................................. 49/489.1, 493.1
See application file for complete search history.

(56) References Cited

U.S. PATENT DOCUMENTS 1,698,924 A * 1/1929 Riek ..................... F25D 23/087 49/489.1
1,960,137 A * 5/1934 Brown .................. E04B 1/6812 428/41.7
2,091,791 A * 8/1937 Newman ............... F25D 23/082 49/489.1
2,935,771 A * 5/1960 Hatcher, Jr. ........... E06B 7/2309 49/493.1
3,039,156 A * 6/1962 Morris, Jr. ............ E06B 7/2309 49/480.1
3,358,402 A * 12/1967 Sahm ...................... E06B 7/231 49/401
4,286,410 A * 9/1981 Hahn ...................... E06B 7/231 404/47
4,328,273 A * 5/1982 Yackiw ................... E06B 7/231 156/244.11
4,535,564 A 8/1985 Yackliw
4,656,785 A * 4/1987 Yackiw ................. E06B 7/2312 49/489.1
4,711,059 A * 12/1987 Layne .................. B65G 69/008 14/71.5
4,930,257 A * 6/1990 Windgassen ............ E06B 1/325 49/400

(Continued)

FOREIGN PATENT DOCUMENTS

FR 2569810 A1 * 3/1986 ........... E06B 7/2314
GB 1299735 A * 12/1972 ............. E06B 7/231

OTHER PUBLICATIONS

All About Door Jambs, Quality Window and Door Ad online, observed June 2020, author and initial date unknown, USA.

(Continued)

*Primary Examiner* — Marcus Menezes
(74) *Attorney, Agent, or Firm* — James K. Poole, Esq.

(57) ABSTRACT

A shaped strip of durable material that is inserted into the weatherstrip slot of a door frame along with the weatherstrip that protects the weatherstrip from damage by pets pawing/clawing at the closed door. A further benefit of this shaped strip is that it doesn't interfere in the normal operation of the door and can be installed without damaging the door or door frame.

14 Claims, 7 Drawing Sheets

(56) References Cited

U.S. PATENT DOCUMENTS

| | | | | |
|---|---|---|---|---|
| 5,007,203 | A * | 4/1991 | Katrynuik | E06B 7/2301 49/482.1 |
| 5,010,691 | A * | 4/1991 | Takahashi | B60J 10/277 49/482.1 |
| 5,737,878 | A | 4/1998 | Raulerson | |
| 6,357,187 | B1 | 3/2002 | Haldeman | |
| 6,711,858 | B1 * | 3/2004 | Albanese | E06B 7/22 49/475.1 |
| 6,826,877 | B1 | 12/2004 | Stradel | |
| 6,829,863 | B2 | 12/2004 | Lovas | |
| 7,047,694 | B2 | 5/2006 | Salzman | |
| 7,204,059 | B2 | 4/2007 | Schiffmann | |
| 7,971,400 | B2 | 7/2011 | Boldt | |
| 8,327,585 | B2 * | 12/2012 | Foster | E06B 7/2314 49/475.1 |
| 8,510,996 | B2 * | 8/2013 | Foster | E06B 5/164 49/489.1 |
| 10,202,794 | B1 * | 2/2019 | Careri | E06B 1/524 |
| 10,329,834 | B2 * | 6/2019 | Mertinooke | B29C 48/12 |
| 10,801,248 | B2 * | 10/2020 | MacDonald | E06B 1/28 |
| D934,671 | S * | 11/2021 | MacDonald | D8/400 |
| 2005/0028447 | A1 | 2/2005 | Salzman | |
| 2007/0017158 | A1 | 1/2007 | Larkin | |
| 2008/0072506 | A1 | 3/2008 | LeGoff | |
| 2008/0172957 | A1 | 7/2008 | Kerscher | |
| 2015/0240556 | A1 * | 8/2015 | Ellingson | E06B 7/2314 49/493.1 |
| 2016/0237738 | A1 | 8/2016 | Mertinook | |
| 2016/0318226 | A1 | 11/2016 | Huntress | |
| 2019/0162015 | A1 * | 5/2019 | Patock | E05D 15/24 |

OTHER PUBLICATIONS

Mistry, Kinjal—"Different Parts of a Door Frame," online publication observed Oct. 1, 2020, dated Jun. 22, 2017, USa.

"Cat proof your weatherstripping," video first observed Jun. 2020, USA at https://www.youtube.com/watch?v=RQ212IriR4Y.

* cited by examiner

DOOR WEATHERSTRIP PROTECTION DEVICE

This application is not a result of federally sponsored research or development.

BACKGROUND OF THE INVENTION

Field of the Invention

The present invention relates to the field of door frames or door jambs and, more specifically, to a shaped protective strip that is inserted in combination with the weatherstrip to protect the weatherstrip from damage from the claws/paws of pets scratching at the door from the exterior side of an entry door.

Description of Relevant Art

A fact of life is that when a household pet is let out of the house it is just a matter of time until the pet wants back into the house. To speed the opening of the door, pets often will scratch or paw at the area where the door edge and door frame come together to attract attention or to push the door open. That contact area where the door edge and door frame come together is where commercially available weatherstrip is installed into and held within the weatherstrip slot of the exterior door frame. The weatherstrip fills the gap between the two vertical and the top horizontal exterior edges of the exterior door and exterior door frame to create a seal to prevent the passage of wind, rain, insects, etc. through the gap between the door edge and the frame and into the interior of the home. The commercially available weatherstrip that fills the gap between the exterior edges of the exterior door and door frame typically includes a thin flexible plastic sleeve with a foam filling, so it can be easily damaged by the claws and nails of pets. Once the weatherstrip has been sufficiently damaged it will no longer provide the seal needed to keep wind, precipitation and insects out and as such must be replaced.

To prevent pet damage to the weatherstrip and the adjacent areas of the door edge and frame, commercially available double-sided adhesive tape is sold to be applied to the areas of the door and door frame where the pet scratches. One side of the tape adheres to the door or door frame and the other side faces the pet. When the pet's paws come in contact with the sticky surface of the tape, the tape grabs the fur/hair/skin on their paws and pulls at it. The pets don't like having their paws contact the adhesive surface, so it makes them stop clawing/pawing. The problem is that over time the sticking face of the tape becomes loaded with dust and debris that contact it and the stickiness diminishes to the point the it no longer dissuades the pet and has to be replaced.

Patents such as Swart, U.S. Pat. No. 3,916,838 and Dixon, U.S. Pat. No. 9,976,342 describe a pet scratch prevention device that consists of a fairly large flat or slightly shaped protective sheet of damage resistant material, such as plastic or hardboard, with a hole located near the midpoint of the upper edge of the device that is sized so that the door knob will pass through it. Once the knob is inserted through the hole, the protective sheet will then be suspended from the door knob so that it hangs down and covers a portion of the door face below the knob, the strike side door frame next to and below the knob and the interface between the door and the frame in that same area. This device would be easy to install on the interior side of the typical in swing style entry door as the door would swing inward towards the user and the presence of the protective sheet would not interfere with the opening or closing of the door. As such the user could hang it and then open and/or close the door from either the interior or exterior side of the door and have the sheet remain in the correct position to prevent pet damage to the protected area.

The installation of the protective sheet on the exterior face of an in swing entry door would be more problematic, as the overlap of the protective sheet and the door frame would interfere with the door freely opening and closing. This overlap would require the user to pass through the door from the inside to the outside, fully close the door and then hang the protective sheet on the outside doorknob. Going back into the house would require that the protective sheet be removed prior to opening the door and left off until the person once again exited the house. Hanging the protective sheet from the exterior knob and then trying to close the door from the inside would be very difficult at best as the sheet would need to be somehow pivoted on the knob in a temporary manner so that the door could be closed without some part of the protective sheet blocking and preventing the proper closing of the door.

The weatherstrip provides the seal between the door frame and the top edge and both vertical outside edges of the exterior face of the entry door. As such, the weatherstrip is primarily susceptible to damage by pets pawing at the outside of the door. Therefore, this problem with easily mounting the protective sheet so that protection of the exterior of the door from pet damage is achieved, regardless of whether the homeowner is inside the home or not, is a shortcoming of this particular device. A secondary problem is the need of a doorknob to mount the device on, which also means that only the one edge of the door can be protected, since there is no knob on the hinge side of the door. A final disadvantage of the device is that it is fairly large and would detract from the aesthetics of the home when it is hanging from the doorknob.

Patents such as Smith, U.S. Pat. No. 5,379,552 and Greiner, U.S. Pat. No. 9,648,852 describe a scratch prevention device that consists of a flat sheet of damage resistant material, such as plastic, that is affixed to the face of the door and acts as a protective surface. The advantage of this device is that it doesn't interfere with the operation of the door, so it can be mounted on either face of the door and the door opened and closed normally. A disadvantage of this device is that, based on the figures and claims, the protective sheet protects a portion of the surface of the door but not the interface between the door and door frame where the weatherstrip is located. As such the use of these devices would not protect the weatherstrip. Other shortcomings of this device include the potential damage or marring of the door face caused by the mounting of the device and that the larger versions would detract from the aesthetics of the home.

In view of the foregoing disadvantages and limitations found in the prior art for a device that will easily and discreetly protect the weatherstrip from pet damage, there is need for an improved device.

SUMMARY

The commercially available weatherstrip for exterior doors consists of a V or U-shaped flexible seal portion that is composed of a thin (typically about 0.005" to 0.010") shaped flexible plastic surface layer that contains a compressible foam filling that is typically about 0.125" to 0.250" in thickness and a stiff thin strip that is attached to one edge of the flexible seal portion that is typically about 0.020" to 0.040" thick and about 0.325" to 0.400" long. The stiff thin strip is designed to be inserted into the weatherstrip slot (typically a 0.125" wide and 0.5" deep saw cut that is machined into the edge of the thick portion of the door frame) so that the weatherstrip is held in the correct location and orientation. Small flexible, compressible ribs are typically attached to the stiff thin strip to create a grip between them and the sides of the weatherstrip slot and to hold the weatherstrip firmly inside the slot. The number, location and orientation of these ribs varies by manufacturer of the weatherstrip.

To protect the weatherstrip from pet damage, the section from the bottom of the door frame to a point above the pet's reach, or the entire length if preferred for uniformity of appearance, of the exposed weatherstrip's flexible seal is covered and protected by a shaped protective strip made of scratch/damage resistant material such as metal or plastic. The shaped protective strip features a thin stiff edge that is thin enough (typically about 0.015" to 0.06") to be inserted into the weatherstrip slot prior to or in combination with the insertion of the stiff thin strip of the weatherstrip. The shaped protective strip has a 90-degree bend next to the thin stiff edge that is followed by a short straight section. The short straight section sits between the flexible seal portion of the weatherstrip and the edge of the rabbet in the door frame in a location and manner that doesn't interfere with the sealing of the flexible seal portion to the door face when closed. To accomplish this, the thickness of the short straight section also needs to between about 0.015" and about 0.06" thick. After the short straight section, and adjacent thereto, the shaped protective strip has a curved section that covers and protects the compressed flexible seal portion of the weatherstrip. The curved section is long enough to protect the weatherstrip but is preferably not so long as to hit the face of the door when the door is closed. The curved section should have-sufficient vertical clearance between its underside and the top of the flexible seal so that it doesn't interfere with the compression and sealing of the weatherstrip to the closed door's face.

The preferred shape of the shaped protective strip allows it to be well secured in place without the use of adhesives or fasteners that could damage or mar the faces of the door or door frame. Additionally, the shape and location of the shaped protective strip allows the door to open and close normally without interference. Finally, the small size of the exposed portion of the shaped strip results in it being much less visible and as such would have minimal impact on the aesthetics of the entry area.

The shaped protective strip can be formed from thin sheets of various resilient metals such as steel, galvanized steel, stainless steel, brass, aluminum and others that can be either roll formed or stamped into the required shape. The shaped protective strips can be formed from various polymeric materials such as polyvinyl chloride (PVC), high density polyethylene (HDPE), polystyrene and others, including polymeric composites, with similar resilient properties, by various types of molding or extrusion processes. The materials should be resilient enough to permit the arcuate sections of the covers to deform or flex slightly if subjected to pressure by coming into momentary contact with the door face if it was forcibly slammed and to return to substantially their original form once the pressure is released. The metal covers can be provided in forms which are paintable, if desired, and the polymeric covers can be produced in various suitable colors to match or harmonize with the colors of door frames, doors or other components.

In summary, the protective covers disclosed herein for the protection of weatherstrip in residential doors comprise narrow strips of resilient sheet material long enough to cover at least a portion of the weatherstrip along the sides of the door. The strips are formed into three sections extending their full length, comprising a) a flat base section extending along one edge of the strip, the section having a width less than the depth of the weatherstrip slot in a door frame; b) a second flat section perpendicular to the flat base section and extending upward therefrom, formed by making a bend of about 90 degrees in the strip which extends along the length thereof, and c) a convex arcuate section adjoining the second flat section, extending from that flat section in a direction opposite that of the flat base section and wide enough to cover at least a portion of the flexible seal of the weatherstrip to which it is applied when installed. The second flat section can have a width of from about 0.25 to about 0.625 inch, and the flat base section and second flat section can each have a thickness of from about 0.015 to about 0.06 inch. The protective covers can be fabricated from a variety of resilient metals and polymeric materials using standard industrial techniques, and different colors can be provided by using paintable metals or polymeric materials which are produced in the desired color. The protective covers can be provided in standard lengths to conform to the lengths of commercial weatherstrip material, or in longer lengths which can be trimmed to size for installation. The flat base sections of the protective covers have thicknesses which permit their insertion into the weatherstrip slots of a door frame atop the stiff thin strip portion of weatherstrip to be installed, with the stiff thin strip portions having several flexible, compressible ribs which compress to retain both the base sections of the covers and the stiff thin strips of the weatherstrip in the weatherstrip slots of the door frame. The arcuate sections of the protective covers are resilient enough to deform slightly if contacted by a closing door, forming a substantially complete cover for the compressed flexible seal of the weatherstrip. The second flat sections of the protective covers are at least as wide as the thickness of a door frame between the bottom of the weatherstrip slot of the door frame and the upper surface of the door frame.

The protective covers can be provided in combination with suitable weatherstrip materials as a kit for convenient installation. The protective covers can be installed with weatherstrip by a process comprising steps of:

a) selecting lengths of protective cover and weatherstrip materials to match the height of the door where they are to be installed, and/or trimming the materials to size;
b) aligning the flat base sections of the protective cover strips atop the stiff thin strip section of the weatherstrip sections;
c) positioning the resulting aligned combinations of protective cover and weatherstrip materials alongside the weatherstrip slots of the door frame, and
d) inserting the combined protective covers and the thin flat sections of the weatherstrip fully into the weatherstrip slot, compressing the compressible ribs of the stiff thin strip sections of the weatherstrip and providing a suitable frictional fit.

As a result, the known deficiencies of the current weatherstrip pet damage prevention devices are overcome.

BRIEF DESCRIPTION OF THE DRAWINGS

The invention will be better understood and aspects other than those set forth above will become apparent when consideration is given to the following detailed description, the appended claims and drawings. The same numerals are used to designate like components in each of these figures. Such description makes reference to the annexed drawing wherein:

DETAILED DESCRIPTION OF PREFERRED EMBODIMENTS

In general, the following description adopts a terrestrial frame of reference, in which the bottom of a component is considered to be the side nearest the floor or earth when in normal use, and the top being the side opposite and facing upward. The term "face" is used to identify the portion of the door frame or jamb that is in closest proximity to the door and is visible. The term "back" is used to identify the reverse portion of the door frame that is in closest proximity to the wall and its internal framing and is not visible. The term "and/or" is used in the conventional sense, in which "A and/or B" indicates that A or B, or both, may be present. Where dimensions are given, they are approximate rather than precise, as required to fit a variety of weatherstrip and door installations. The term "thin," as applied to both the shaped strip of the protective shield and the portion of the weatherstrip which is inserted into the weatherstrip slot, refers to a thickness which is less than about half the width of the weatherstrip slot. Since this slot is usually about 0.125 inch, for both the weatherstrip portion and the shaped strip of the protective shield to occupy it securely at the same time, each strip should be less than about 0.06 inch thick. A prototype protective shield which w extruded from rigid PVC had both the insert and central portion of the shield about 0.02 inch in thickness.

Figure 1:
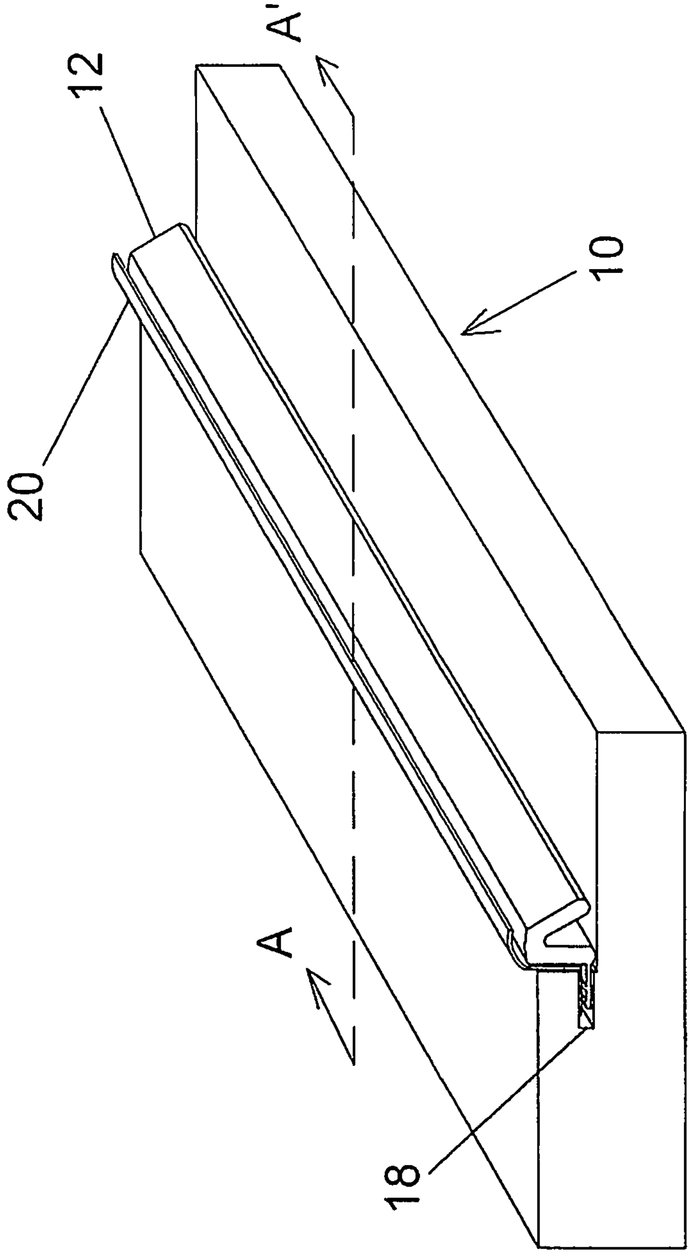
FIG. 1 is an oblique view of a section of a typical entry door frame that has been fitted with both weatherstrip and the shaped protective strip.

With reference to FIG. 1, a section of typical exterior door frame (10) is shown with the shaped protective strip (20) and weatherstrip (12) inserted together into the weatherstrip slot (18) that is machined into the face of the door frame (10). The shaped protective strip (20) is designed and adapted to fit snugly into weatherstrip slot (18) with weatherstrip (12) and cover the compressible portion of the weatherstrip (12) when the door (not shown) is closed.

Figure 2:
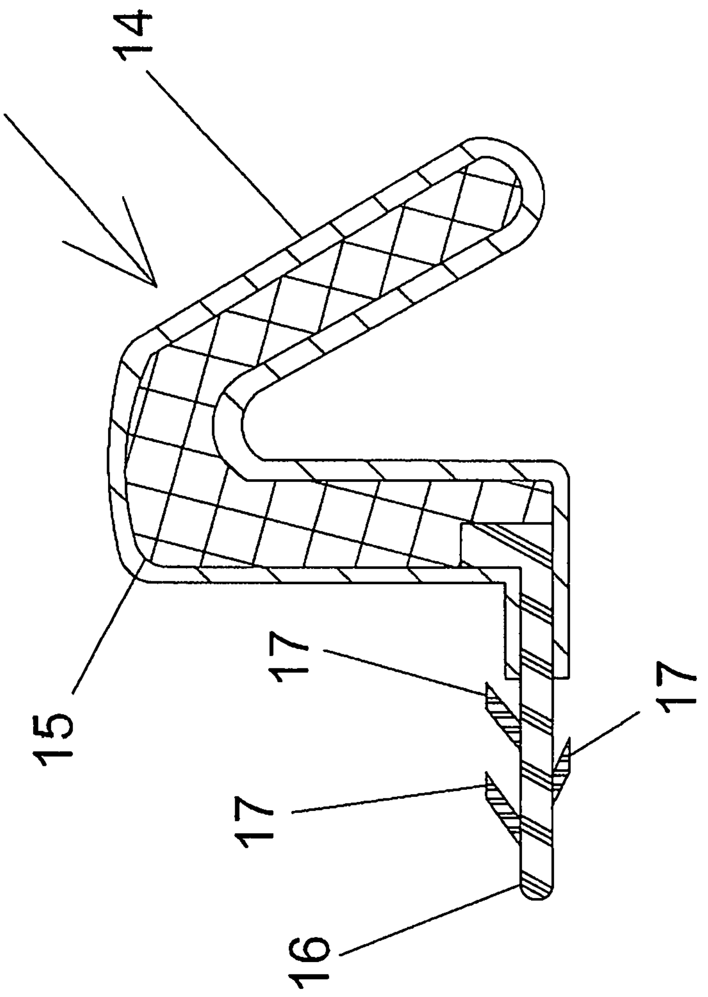
FIG. 2 is a cross sectional detail view (section AA' of FIG. 1) showing the construction details of the commercially available weatherstrip.

With reference to FIG. 2, a cross section of commercially available weatherstrip (12) is shown with the shaped thin flexible plastic surface layer (14) and compressible foam filling (15) that together form the V or U-shaped flexible seal that creates the seal between the door frame and closed door (not shown). At the base of the V or U-shaped flexible seal a stiff thin strip (16) is attached by having the shaped thin flexible plastic surface layer (14) bonded to both the upper and lower faces of the stiff thin strip (16). The stiff thin strip (16) has several flexible and compressible ribs (17) bonded to the upper and lower faces of the stiff thin strip (16) that help to create the grip that holds the stiff thin strip (16) of the weatherstrip (12) in the weatherstrip slot (not shown) after it has been inserted. The shape, number, size and location of the flexible and compressible ribs (17) on the stiff thin strip (16) vary by manufacturer of the weatherstrip (12). The actual materials used for the compressible foam filling (15), the shaped thin flexible plastic surface layer (14), the stiff thin strip (16) and the flexible and compressible ribs (17) vary by manufacturer. As there are a number of manufacturers of weatherstrip, individual manufacturers will periodically change the materials used to either improve the performance of or reduce the cost of their weatherstrip in an attempt to gain a competitive advantage in the market.

Figure 3B:
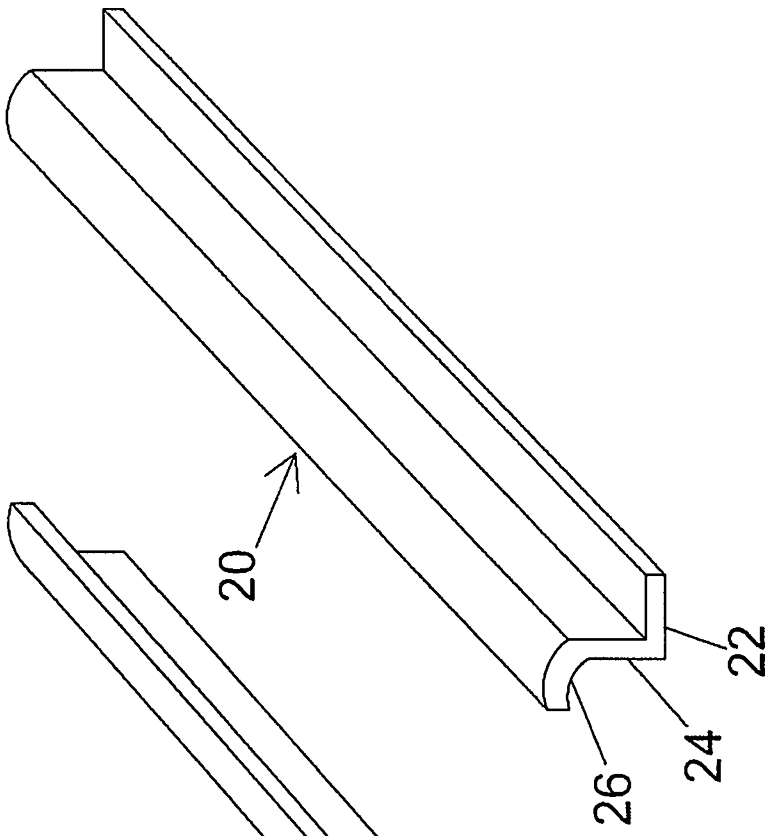
FIGS. 3A and 3B are oblique views of the described shaped protective strip, from opposite sides.
Figure 3A:
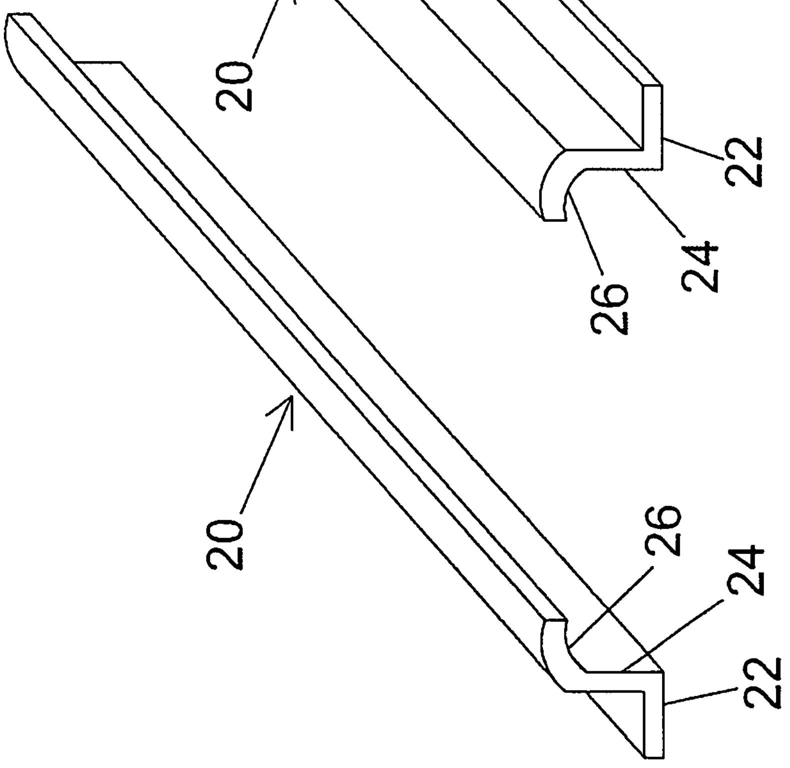

With reference to FIGS. 3A and 3B, two short sections of the shaped protective strip (20) are shown from opposite sides. The shaped protective strip (20) features a thin stiff edge (22) which is designed and adapted to be inserted into the weatherstrip slot (not shown) in combination with the weatherstrip (not shown) to hold it in the correct position in the door frame (not shown). Next to the thin stiff edge (22) is a short straight section (24) which is oriented perpendicular to the thin stiff edge (22). The short straight section (24) aligns with and will lay against the flat edge of the door frame (not shown) that runs from the weatherstrip slot (not shown) to the thick section face of the door frame (not shown). By being placed in this manner, the short straight section (24) does not interfere with the compression and function of the flexible seal (not shown) of the weatherstrip (not shown) after insertion into the weatherstrip slot (not shown). The width of the short straight section will preferably be from about 0.250" to about 0.625" as the difference in thickness of the thick and thin portions of a standard exterior door frame is ½ inch and the upper edge of the weather strip slot is typically located between about 0.25" and about 0.375" below the face of the thick portion of the exterior door frame. This width could be altered if needed to match the thickness and weatherstrip slot location differences associated with a non-standard frame. Next to the short straight section (24) the shaped protective strip (20) has a curved section (26). The purpose of the curved section (26) is to cover and protect the flexible seal (not shown) of the weatherstrip (not shown) from damage. The radius and angle of the curved section (26) are such that there will normally be clearance between the weatherstrip (not shown) and the shaped section (26) even when the weatherstrip (not shown) is compressed by a closed door (not shown). The width of the curved section (26) is sized so that the edge of the shaped protective strip (20) will almost touch the face of the closed door (not shown) so that it fully protects the weatherstrip (not shown) but normally doesn't interfere with the closure of the door (not shown).

Figure 4:
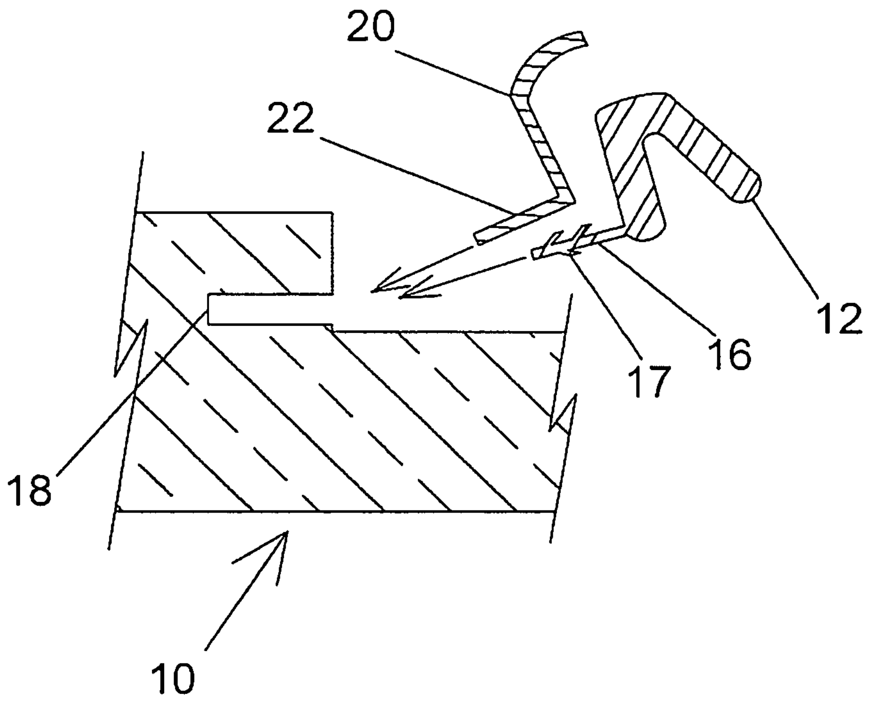
FIG. 4 is a cross sectional detail view (section AA' of FIG. 1) showing the relative location, orientation and direction of movement of the weatherstrip and shaped protective strip to the door frame during the act of insertion.

With reference to FIG. 4, the relative positions, orientation and direction of movement of the shaped protective strip (20) and the weatherstrip (12) are shown as they are in the process of being installed by being inserted together into the weatherstrip slot (18) of the door frame (10). The stiff thin edge (22) of shaped protective strip (20) will fit snugly atop the stiff thin strip (16) of weatherstrip (20) when inserted, with compressible ribs (17) helping to maintain these two components in position within the weatherstrip slot (18).

Figure 5:
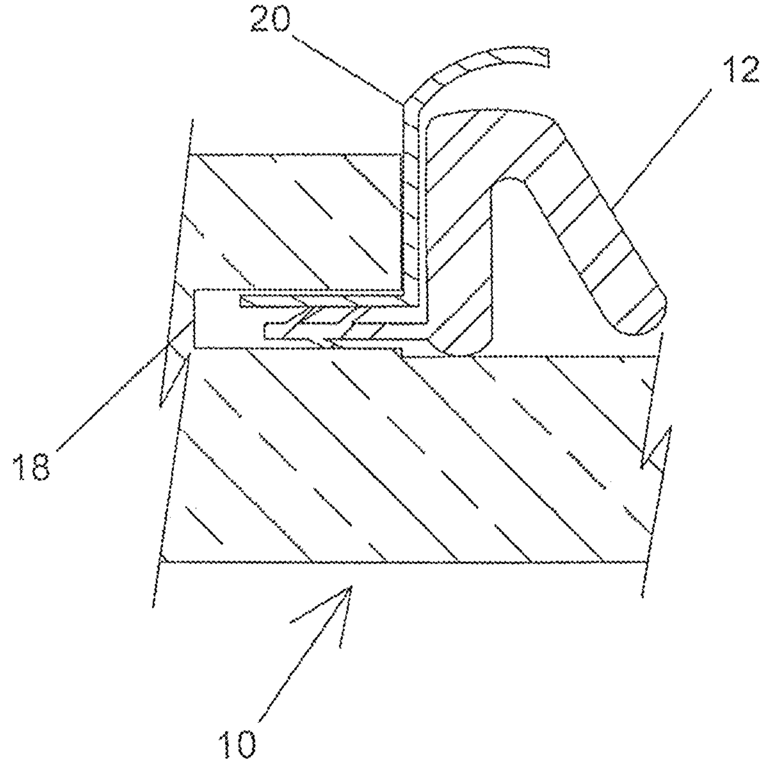
FIG. 5 is a cross sectional detail view (section AA' of FIG. 1) showing the location and orientation of the weatherstrip and shaped protective strip relative to the door frame after insertion.
Figure 5A:
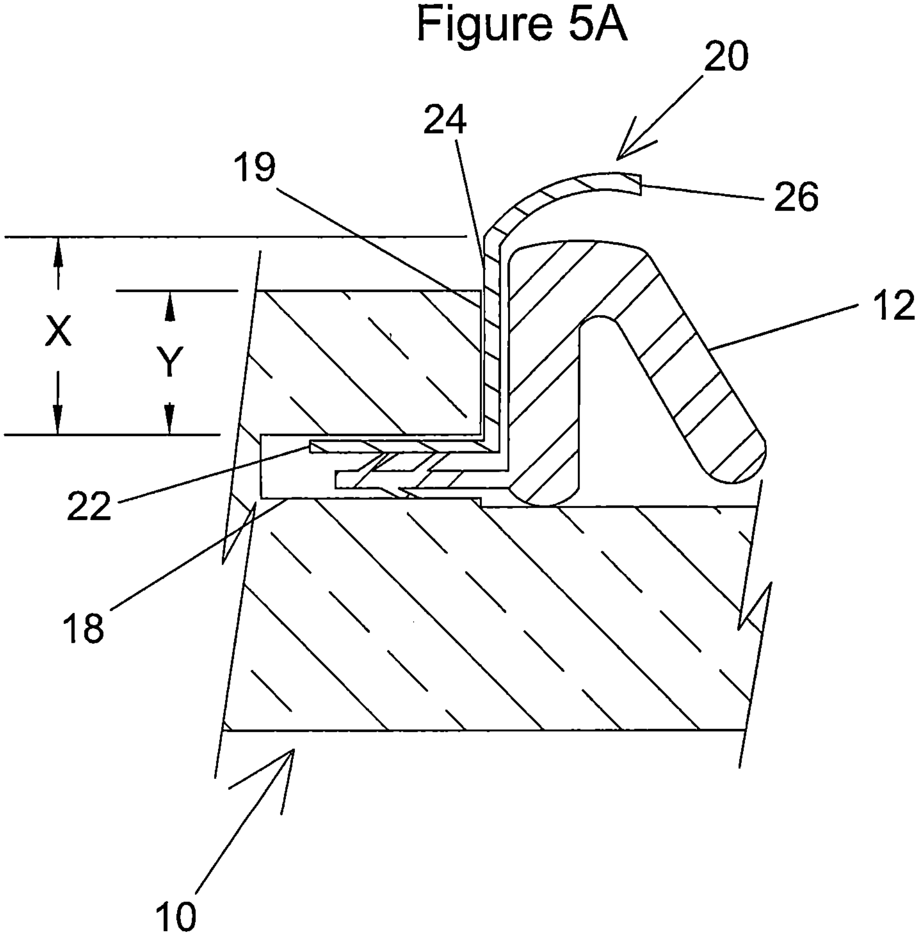
FIG. 5A is a version of FIG. 5 annotated to illustrate dimensional ratios of a protective cover as installed on the weatherstripping of a door.

With reference to FIG. 5, the shaped protective strip (20) and the weatherstrip (12) are shown after they have been installed into the weatherstrip slot (18) of the door frame (10). FIG. 5A illustrates that the length of the short straight section of the protective strip (24), marked "X" in the figure, is greater than the edge (19) between the door frame face and the weatherstrip slot (18), marked "Y" in the figure. This corresponds to the dimensional ratio recited in claim 7.

Figure 6:
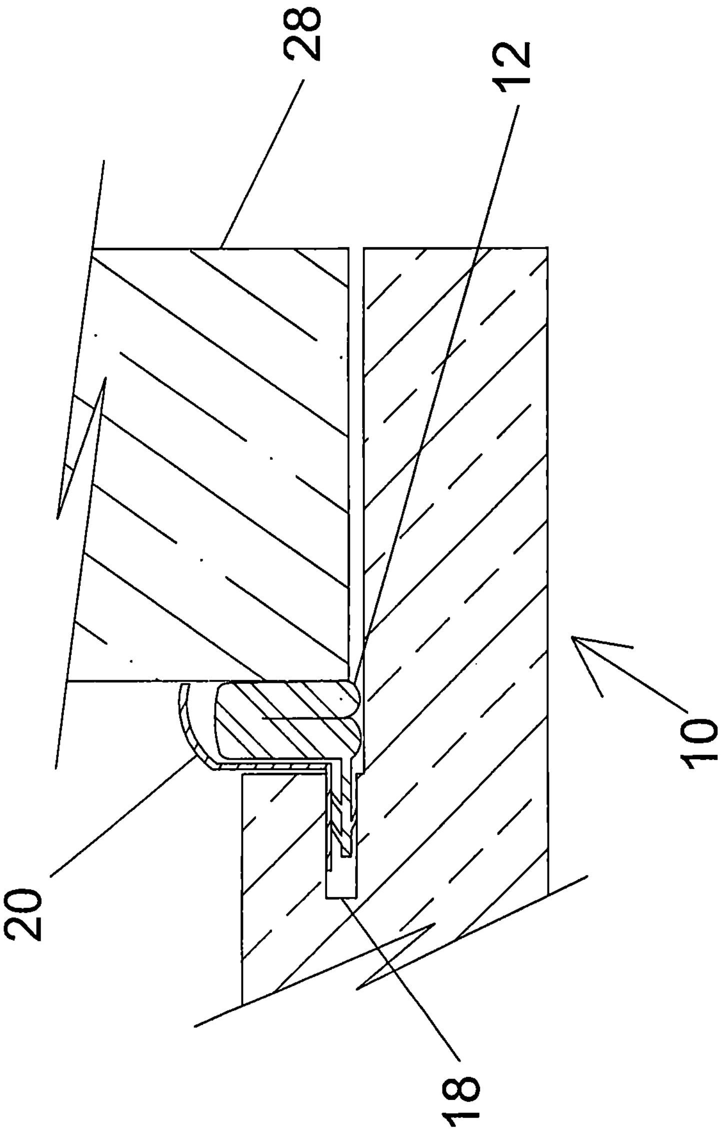
FIG. 6 is a cross sectional detail view (section AA' of FIG. 1) showing the compression of the weatherstrip and clearance between the shaped protective strip and weatherstrip and door when the door is in the closed position.

With reference to FIG. 6, the shaped protective strip (20) and the weatherstrip (12) are shown after they have been installed into the weatherstrip slot (18) of the door frame (10). A door (28) is shown in the closed position so that the clearance between the shaped protective strip (20) and both the compressed weatherstrip (12) and the face of the door (28) can be shown. In addition to protecting the weatherstripping compressible seals from damage by pets or other animals, the covers can protect the polymeric seals of the weatherstripping against damage from sunlight, ozone and other adverse environmental conditions.

In the foregoing description, certain terms have been used for brevity, clarity and understanding. All equivalent relationships to those illustrated in the drawings and described in the preferred embodiment are to be encompassed by this present invention to produce the intended results. It is also to be understood that the following claims are intended to cover all of the generic and specific features of the invention herein described, and all statements of the scope of the invention which, as a matter of language, might be said to fall therebetween.

Having thus described and disclosed preferred embodiment of my invention, what I claim as my invention is:

1. A protective cover for weatherstripping, wherein the weatherstripping comprises a V or U-shaped flexible seal comprising a thin, flexible plastic surface layer enclosing a compressible foam filling, the seal being adapted to create a seal between a door jamb or frame where the seal is installed and a closed door, with the seal attached to a stiff, thin strip which is adapted to fit inside a weatherstrip slot in the door jamb or frame, with the stiff, thin strip adapted to be installed in the weatherstrip slot in the door jamb or frame which encloses a door, said protective cover comprising a narrow strip of sheet material covering at least a portion of the distance from the bottom of the entry door to the full height of the door, said protective cover comprising three sections extending the length of said protective cover:

a) a flat, thin, stiff edge section extending protective cover, said thin, stiff edge along one edge of said section having a width less than the depth of a weatherstrip slot in the door jamb or frame;

b) a flat, short, straight section substantially perpendicular to said thin, stiff edge section a of said protective cover and extending along the length thereof, with said flat, short, straight section having a width of from about 0.25" to about 0.625";

c) a convex arcuate section comprising scratch-resistant material adjoining said flat, short, straight section of said protective cover, extending from said flat, short, straight section in a direction opposite said flat, thin, stiff edge section, and wide enough to cover at least a portion of the V or U-shaped flexible seal of the weatherstripping when said protective cover is installed thereon.

2. The protective cover of claim 1, wherein said protective cover is formed of a resilient metal.

3. The protective cover of claim 2, wherein at least said convex arcuate section is paintable.

4. The protective cover of claim 1, wherein said protective cover is formed of a resilient polymeric material.

5. The protective cover of claim 4, wherein at least said convex arcuate section is provided in selected colors.

6. The protective cover of claim 1, wherein said protective cover is provided in lengths sufficient to be trimmed to the heights of a variety of doors.

7. The protective cover of claim 1, wherein said flat, thin, stiff edge section and said second flat, short, straight section each have thicknesses in the range of from about 0.015 to about 0.06 inch.

8. A process for the installation of said weatherstripping in combination with said protective cover of claim 1, comprising steps of:

a) selecting lengths of the weatherstripping and protective cover to match the height of a door where the weatherstripping and said protective cover are to be installed; and b) aligning the flat, thin, stiff edge section of said protective cover atop the stiff, thin strip of the c) positioning the resulting aligned combination of said protective cover and the weatherstripping alongside the weatherstrip slot of the door jamb or frame; and d) inserting the combined protective cover and the stiff, thin strip of the weatherstripping fully into the weatherstrip slot, to provide a stable frictional fit.

9. The process of claim 8, wherein the stiff, thin strip of the weatherstripping comprises compressible ribs which are compressed during insertion into the weatherstrip slot to provide a stable frictional fit.

10. The process of claim 8, wherein at least one of the weatherstripping and said protective cover of claim 8 are trimmed to suitable size for installation.

11. A protective cover for weatherstripping installed in a door frame, wherein the weatherstripping is a product comprising a V- or U-shaped flexible seal comprising a thin, flexible plastic surface layer enclosing a compressible foam filling, with the seal being adapted to create a seal between the door frame where the seal is installed and a closed door hung in the frame, and the seal is attached to a stiff, thin strip adapted to be installed in a weatherstrip slot in the door frame, wherein said cover comprises a strip of sheet material which is formed to comprise three sections extending the length of said stiff, thin strip:

a) a flat, thin, stiff edge section extending along one edge of said strip, with said flat, stiff edge section having a width less than the depth of the weatherstrip slot in the door frame;

b) a flat, short, straight section substantially perpendicular to said stiff edge section, with said flat, straight section having a width of from about 0.25 to about 0.625 inch; and c) a convex arcuate section comprising scratch-resistant, flexible material adjoining said flat, straight section and extending in a direction opposite said flat, thin, stiff edge section, said arcuate section being wide enough to cover at least a portion of the flexible seal of the weatherstripping when said protective cover is installed with the weatherstripping and the door is closed.

12. The protective cover of claim 11, wherein said thin, stiff edge section of said protective cover has a thickness which permits its insertion into the weatherstrip slot atop the stiff, thin strip of a section of the weatherstripping, to maintain the weatherstripping in position after installation.

13. The protective cover of claim 11, as installed in the door frame, wherein said arcuate section is resilient enough to deform slightly when contacted by the door closing thereon, forming a substantially complete cover for the compressed flexible seal of the weatherstripping when compressed by the closed door, and regaining said arcuate section's original shape when pressure is released by opening the door.

14. The protective cover of claim 11 wherein said flat, short, straight section is greater than the thickness of the door frame between an inner edge of the weatherstrip slot of the door frame and an inner face of a thicker portion of said door frame.

* * * * *